Jan. 16, 1940.　　　W. H. SCHUMANN　　　2,187,666
ARTIFICIAL FISH BAIT
Filed June 1, 1936　　　2 Sheets-Sheet 1
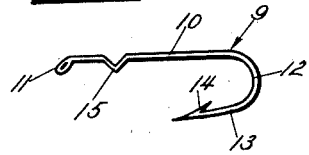
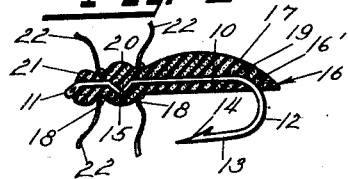
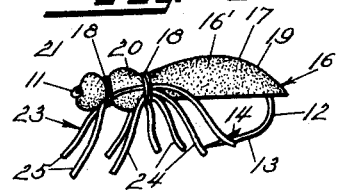
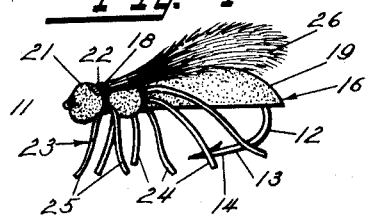
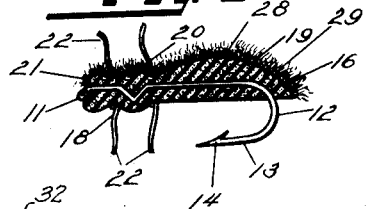
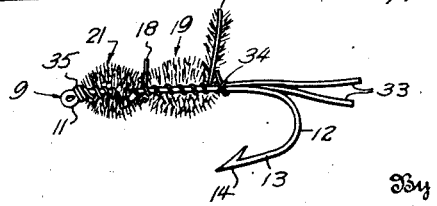
Inventor
William H. Schumann
By Strauch & Hoffman
Attorneys Jan. 16, 1940.  W. H. SCHUMANN  2,187,666
ARTIFICIAL FISH BAIT
Filed June 1, 1936  2 Sheets-Sheet 2
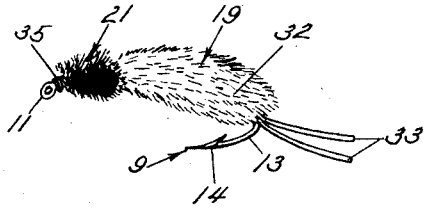
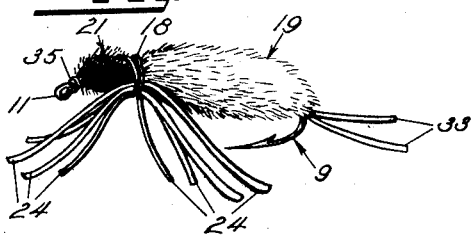
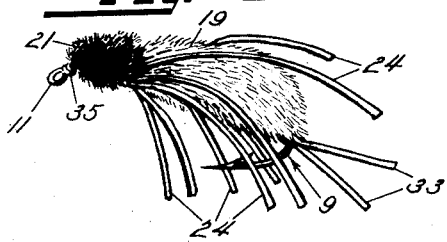
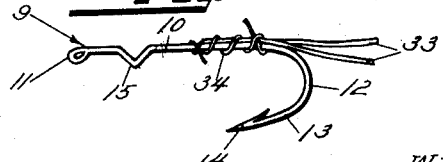
Inventor
William H. Schumann
By Strauch & Hoffman
Attorneys Patented Jan. 16, 1940

2,187,666

UNITED STATES PATENT OFFICE 2,187,666

ARTIFICIAL FISH BAIT

William H. Schumann, Kent, Ohio, assignor to Fly Fish Kit Company, Kent, Ohio, a corporation of Ohio Application June 1, 1936, Serial No. 82,946

12 Claims. (Cl. 43—48)

The present invention relates to the manufacture of artificial fishing lures. More particularly the present invention relates to the manufacture of artificial flies designed to simulate the "Water Cricket," i. e., the "Dragon Fly" in the creeper stage of its life.

It has been found, by experience, that a number of species of fish, particularly blue gills, salmon, bass and trout, are more readily enticed by using the "Dragon Fly Creeper" as bait. With this fact in mind attempts were made to produce an artificial fly having the characteristic appearance of the "Dragon Fly Creeper." These attempts, using floss, feathers and other well known fly manufacturing materials, resulted in failure due to the peculiar flat shape of the "Dragon Fly Creeper." After continued experimentation, it was found that the materials best suited for the formation of a fly having the characteristic appearance above mentioned, were sponge rubber (for the body, thorax and head), para-rubber (for the feelers and legs) and hair, preferably squirrel tail hair (for the wings).

This invention, therefore, has for its major object the provision of a novel artificial fly having the characteristic appearance of the "Dragon Fly Creeper," or other water insects which will simulate animation when drawn through the water and which are sturdy and durable.

A further important object of this invention resides in the manufacture of an artificial fly using deformable water resistant materials as the principal structural elements.

Another object of the present invention resides in making the feelers and legs of an artificial fly of small bands of rubber which will lend animation to the fly as it is pulled through the water.

A further object of the invention resides in providing an artificial fly with a covering of water-proof fur, such as, the under fur of the muskrat.

Another object of the present invention resides in providing an artificial fly with wings made of hair, such as squirrel tail hair.

A further object resides in the provision of an artificial fly having wings, feelers, legs, etc., adapted to simulate the life-like movements of a live fly irrespective of whether the fly is used as a floating or a submerged lure.

Further objects will appear as the description proceeds in connection with the appended claims and attached drawings wherein:

Figure 1 is an elevational view of a preferred form of hook used in the manufacture of the artificial fly of the present invention.

Figure 2 is a longitudinal sectional view showing the manner in which the body, thorax and head of the fly are formed and secured to the hook of Figure 1.

Figure 3 is an elevational view of the fly of Figures 1 and 2 showing the manner in which the legs and feelers are secured to and depend from the body and thorax.

Figure 4 is an elevational view of the completed fly of Figures 1, 2 and 3 showing the wings secured thereto.

Figure 5 is a sectional view, similar to Figure 2, showing a modified form of fly wherein the body, thorax and head are covered with waterproof fur.

Figure 6 is an elevational view of a further modified form of fly wherein the body, etc., is formed of chenille and tail filaments of rubber thread are provided.

Figure 7 is a further view of the fly of Figure 6 showing the manner in which the rubber leg threads are secured thereto.

Figure 8 is an elevational view showing the completed lure of Figures 6 and 7.

Figure 9 is an elevational view showing one method of securing the tail filaments to the hook.

Figure 10 is an elevational view illustrating the spiral winding of the chenille cord on the hook.

With continued reference to the drawings, wherein like reference characters are used to designate the same parts throughout the several views, a special type of hook 9 is used and it preferably takes the form of the well known "inside hump shank hook." As seen in the drawings this hook has a shank 10 provided at one end with an eye 11 and at its opposite end with a loop 12 formed by bending the end 13 of shank 10 in any well known manner. A barb 14 is provided on the end of the loop 12 and the shank 10 near the eye 11 is provided with a V-shaped offset portion 15. Offset portion 15 is designed to prevent the covering material 16, which is preferably formed of sponge rubber, from slipping along or around shank 10. End 13 of hook 9 is preferably disposed in vertical alignment with shank 10 and directly beneath it and is designed to simulate the tail of the finished creeper or other insect.

In the form of the invention shown in Figures 1 to 5 inclusive the covering material consists of sponge rubber having very fine pores 16'. The present preferred method of forming the body from sponge rubber contemplates the freezing of the rubber by soaking it in water and subjecting it to freezing temperatures or subjecting the rubber to freezing temperatures in a humid atmosphere. The rubber thus frozen assumes a comparatively rigid, workable form. The frozen rubber is then cut into blocks by the use of scissors, knives or the like and then trimmed to form a flat under surface and a curved upper surface or back 17 which is tapered toward the rear to form the rear portion of the body of the "Dragon Fly Creeper." The shaped covering material is then mounted on hook 9 in any suitable manner such as threading the hook therethrough.

While the above described method of manufacture suffices where relatively small quantity production is involved, it has been found that commercial production on a large scale can be carried out with greater facility by molding the rubber around hook 9 and imparting the shape thereto at the same time. It is also commercially feasible to form the material by means of dies, in which case the rubber may or may not be frozen as previously described.

The pre-shaped material after being mounted on hook 9, as above described, is secured in place by silk or other suitable tying strands 18. Strands 18 are designed to encircle the material 16 one or more times on one or both sides of offset portion 15 and are drawn tight and tied to compress the rubber at these points. The compressed portions (as shown in Figures 1 to 5) divide the fly into three sections, a body portion 19, a thorax portion 20 and a head 21. The tying operation firmly embeds portion 15 of the hook in material 16, and thereby prevents the material from slipping lengthwise of or around the shank. Strands 18 are preferably of sufficient length to permit a knot to be tied in order to maintain the rubber under compression at the selected points, but if desired they may be made of fine wire and the ends thereof twisted to secure them in place. The free ends 22 of strands 18 are preferably of sufficient length to encircle the material 16 for a purpose which will now be described.

A plurality of small rubber threads or strands 23, preferably formed of para-rubber are used to form leg and feeler filaments designated by numerals 24 and 25 respectively. Para-rubber, due to its ability to retain its "life" after repeated wetting and exposure to the summer heat, has been found to be the most desirable material for this purpose. Threads 23 are supplied in different sizes depending upon the particular species of fish for which the fly is to be used. For example, a bass fly is provided with strands having a square cross-section 1/40 of an inch on a side whereas a trout fly is provided with strands having a square cross-section 1/64 of an inch on a side.

Legs 24 formed by strands 23 are secured between the body and thorax by means of the ends 22 of the rearmost tying strand 18. Strands 23 are preferably gripped by band 18 midway between their ends so that one strand will form a pair of legs as seen in Figures 3 and 4 of the drawings. Feelers 25 are formed by securing the formost legs 24 between the head and the thorax as seen in Figure 3 or by securing an independent strand 23 between the head and thorax as seen in Figure 4. In either case, the free ends 22 of the forwardly disposed tying tying strand 18 are used for this purpose. Although I have described strands 18 as being brought about the body of the fly for compressing the rubber, and then being brought again around the body to secure the feelers and legs in place, it is to be understood that the feelers and legs may be secured in place under the first turn of strands 18, or on the other hand, additional strands may be employed to hold the feelers and legs in place.

If desired, the fly as shown in Figures 3, may be used as the lure, however, it has been found that the incorporation of hairs bunched together to form wings 26, as seen in Figure 4, materially increases the attractiveness of the fly. The preferred form of lure is accordingly provided with wings 26 which are secured to the fly by means of the tying strand 18 which secures feelers 25 to the fly of Figure 4. Wings 26 preferably consist of squirrel tail hair, but any other suitable material may be used.

A modified form of the invention is shown in Figure 5. In this form of the invention the upper surface of the fly is provided with a coating of a suitable cement 28 and a layer of fur 29, preferably the under-fur of the muskrat, is secured to material 16 by this coating. Legs 24, feelers 25 and wings 26, like those described in the previous embodiment of the invention, are then applied in the same manner. A fly constructed in this manner has been found to be of a more natural appearance and as a consequence is somewhat more successful in use.

It is often desirable to be able to use the fly either as a surface lure or a submerged lure, the present invention readily providing this dual use. In this connection, pores 16' serve as minute pockets wherein air is trapped to impart the desired buoyancy to the fly. If a submerged lure is desired, the fly is held under water and material 16 is compressed between the fingers to expel the air. Upon release of the material 16, the pores 16' fill with water and the fly becomes water-logged and sinks. When it is again desired to use the fly as a dry lure the water may be expelled from the pores by squeezing it.

A further modified form of the invention is shown in Figures 6, 7 and 8. The fly, in this embodiment of the invention, is made by winding a length of chenille cord 32 spirally around shank 10 of hook 9. Tail threads or filaments 33 of para-rubber are provided and are preferably secured to shank 10 by means of cord 32 or if desired threads 33 may be secured in place by means of a separate tying strand 34 as shown in Figure 9. Cord 32 is fastened at its opposite ends by tying strands 35 of silk or the like. Legs 24, like those previously described, are secured adjacent offset portion 15 of hook 9 by means of tying strands 18 which (as shown in Figures 6 to 8) are disposed on the side of said offset portion 15 opposite that upon which the front securing cord 35 is located and divides the fly into two parts, a head 21 and body 19.

Because of the chinille cord, this fly has a fluffy appearance and the shape of the fly is therefore, less definite. In all of the forms of the invention, the loop 11, which is of a brass color, forms the protruding eyes characteristic of the natural fly and thereby enhances the lifelike appearance of the lure.

It is to be understood that tail threads 33 may be used in all forms of the invention, although loop 12 of hook 9 is intended to simulate the tails of the lures shown in Figures 1 to 5. Tying strands 18, since they are preferably formed of thin silk thread and are embedded in the body, are not visible in any of the forms of the invention.

I have found that the rubber threads used in the various forms of the invention respond to every little ripple on the water and slight movements of the line with the result that they undergo a constant quivering action and lend a surprising degree of animation to the fly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An artificial fly comprising a hook, a sponge rubber member mounted on said hook and shaped to simulate the form of a live fly, a multiplicity of hairs mounted on said member and operable to simulate the wings of a live fly, at least one rubber thread mounted on said member and designed to simulate the feelers of a live fly, at least one gripping strand encircling said member for securing said hairs upon the upper surface of said rubber member and said rubber strand to the under surface thereof, a multiplicity of rubber threads associated with said member and simulating the legs of a live fly and a gripping strand for securing said rubber threads to the lower surface of said rubber member, said hairs and rubber strands being secured to said member at only one point, whereby the free portions thereof may freely respond to movement of the rod and line or to the relative movement of the water and quiver in a manner similar to the corresponding appendages of a live fly.

2. A fly comprising a hook, a fibrous covering material mounted on said hook and forming a body, rubber tail appendages secured to said hook beneath said covering material and protruding rearwardly therefrom, rubber legs and feelers secured to the exterior of said covering material, and relatively thin, strong gripping strands for clamping said legs and feelers in place upon said body, said strands being tightly drawn around said body to divide the same into sections and impart a life-like shape to said fly and to embed said strands in said material, whereby said strands are rendered substantially invisible.

3. A fly comprising a hook, a deformable covering material mounted on said hook and shaped to simulate the body of a live fly, a plurality of flexible thin rubber filaments associated with said body and simulating the legs and feelers of a live fly, and a plurality of relatively thin, strong securing strands encircling said body and clamping said legs and feelers against said body, said strands being drawn tightly about said body and embedded in said material, whereby they are rendered substantially invisible.

4. In an artificial fly, a fish hook, a body member of deformable material mounted on the shank of said hook, said member being shaped to provide a head portion, an end portion, and an intermediate enlarged portion, separate spaced means surrounding said member to form the intermediate enlarged portion, and a multiplicity of elongated threads projecting laterally in opposite directions from said member and forming flexible legs which may quiver in a manner simulating the movement of the legs of a live fly.

5. An artificial lure for use in fishing comprising a hook; a deformable body surrounding the shank of said hook, said body having a multiplicity of fine pores in which air is normally trapped but from which the air may be readily expelled by applying pressure and deforming the covering material, whereby the lure may be used as a floating or a submerged lure, elongated thread-like rubber members secured to said body member and extending laterally in opposite directions from said body and designed to quiver in simulation of the legs of a live lure, and means encircling said body in two spaced planes to compress said body and form a head portion and an enlarged portion.

6. An artificial lure for use in fishing comprising a fish hook; a deformable body surrounding the shank of said hook, means encircling said body in a plane adjacent one end thereof for compressing said body and forming a head portion and means encircling said body in a plane spaced from said first mentioned plane for compressing said body and forming a thorax portion.

7. An artificial lure for use in fishing comprising a fish hook having a shank; an offset portion on said shank lying in the longitudinal plane of the shank; a deformable body surrounding the shank and said offset portion; means encircling said body in a plane transverse thereto and on one side of said offset portion for retaining said body on said shank and preventing relative sliding of said hook and said body in one longitudinal direction; and means encircling said body in a plane transverse thereto and on the other side of said offset portion for compressing said body to form an enlargement and preventing relative sliding movement of said hook and said body in the other longitudinal direction.

8. A fish hook, a body of sponge rubber or material of like liquid absorbent properties surrounding said fish hook and having an end portion and an adjacent laterally enlarged portion forming with the end portion a groove, a plurality of flexible thread-like rubber legs, and means joining the legs to said body, said joining means being positioned in surrounding relation with the body and located within said groove.

9. An artificial lure for use in fishing comprising a hook, a body of deformable material mounted upon the shank of said hook, means encircling said body and substantially compressing said material toward said shank and constituting the sole means to produce at least one section of reduced cross-section that visibly separates uncompressed portions of said body and thus brings the shape of said body into approximate simulation of the body of a live fly, bug, or the like, and elongated highly-flexible threads secured to said body and projecting laterally thereof and forming legs simulating the legs or antennae of a live fly, bug or the like and designed so as to quiver when the lure is used in fishing.

10. An artificial lure for use in fishing comprising a hook, a body of deformable material surrounding the shank of said hook, means encircling said body and substantially compressing said material toward said shank to bind said material to said shank and constituting the sole means to produce at least one section of reduced cross-section that visibly separates uncompressed portions of said body and thus brings the shape of said body into approximate simulation of the body of a live fly, bug or the like, and means to prevent shifting of said body along said shank toward the bight of said hook.

11. An artificial fishing lure, comprising a hook, a porous rubber body secured to the shank of the hook in surrounding relation thereto, said body having a reduced cross-section in at least one zone to bring the shape of said body into approximate simulation of the body of a live fly or bug, and strands of highly flexible rubber threads attached between their ends to said body and forming legs, the ends of said strands extending away from said body and being free to move after the manner of the legs or antennae of a live fly or bug.

12. An artificial fishing lure, comprising a hook, a body of soft compressible material secured to the shank of said hook in surrounding relation thereto, said body being reduced in cross-section in at least one zone to bring the shape of said body into approximate simulation of the body of a live fly or bug, and strands of highly flexible rubber threads attached between their ends to said body and forming legs, the ends of said strands extending away in opposite directions from said body and being free to move after the manner of the legs or antennae of a live fly or bug.

WILLIAM H. SCHUMANN.